UNITED STATES PATENT OFFICE.

EMANUEL KLEIN, OF NEW YORK, N. Y.

INK FOR MARKING CIGARS OR TOBACCO.

SPECIFICATION forming part of Letters Patent No. 646,122, dated March 27, 1900.

Application filed August 15, 1899. Serial No. 727,281. (No specimens.)

*To all whom it may concern:*

Be it known that I, EMANUEL KLEIN, a citizen of the United States, and a resident of New York city, county and State of New York, have invented new and useful Improvements in Coloring Compositions, of which the following is a specification.

This invention relates to a coloring composition adapted to be applied for marking tobacco and for stenciling, painting, and printing trade-marks or names upon cigars, cigarettes, and the like, so that the design subsequently appears incombustible upon the ashes. The composition is, however, also well adapted for application to ceramic ware, textiles, and other objects.

In carrying my invention into effect I proceed as follows:

First. Lanolin (or its equivalents, such as cholesterin, isocholesterin, or ceryl alcohol) is heated in an open vessel communicating with a worm. White vapors will escape, which are liquefied in the worm and may be utilized for different purposes. Gradually the vapors in the vessel will become stronger and will suddenly ignite, when the vessel is closed by a hermetic lid, the heat-supply withdrawn, and the contents are allowed to cool. This operation is repeated several times, so that the residue when allowed to cool becomes an inspissated mass, which will dry quickly, is odorless, of dark-brown color, and possesses great adhesiveness. If desired, some quickly-drying, non-poisonous, tasteless, and odorless oils or fats may be mixed with the lanolin, and the resulting compound may be bleached.

Second. An incombustible inorganic or organic color or pigment which will retain its appearance under the influence of heat is prepared. If a brown red is desired, it may be obtained as follows: Carbonate of iron or black oxid of iron (which are equivalents for the purpose of this invention) is subjected to a glow heat in a closed fireproof crucible for about half an hour and is then cooled and ground.

Third. About forty-five per cent., by weight, of the prepared lanolin is cooked for several minutes with about fifty-four per cent. of the prepared coloring-matter. The mass is allowed to cool and is ground. If desired, one per cent. of a suitable drier, such as boracic protoxid of manganese, may be added.

Fourth. The composition thus made is applied in suitable design by a brush, stamp, stencil, or printing-press to tobacco and to the wrappers of cigars, cigarettes, or similar articles. When the tobacco is consumed, the design will be retained in conspicuous color upon the ashes, whether they are light or dark.

The composition will set quickly, is indelible in water, and is not consumed by fire. The particular merit of the prepared lanolin base is that it intimately unites with the tobacco, so that it fixes the color. At the same time the lanolin will be consumed readily by the fire without giving off odors or impairing the burning quality of the tobacco.

What I claim is—

1. The process of producing a coloring composition, which consists in inspissating lanolin, mixing it in a liquid state with a pigment, and cooling the mixture, substantially as specified.

2. The process of producing a coloring composition, which consists in inspissating lanolin, subjecting carbonate of iron to a glow heat, mixing it with the inspissated lanolin, and cooling and grinding the mixture, substantially as specified.

EMANUEL KLEIN.

Witnesses:
WILLIAM SCHULZ,
F. V. BRIESEN.